(12) United States Patent
Zhu et al.

(10) Patent No.: US 11,738,873 B2
(45) Date of Patent: Aug. 29, 2023

(54) AIRCRAFT ENVIRONMENTAL CONTROL SYSTEM

(71) Applicant: UNITED TECHNOLOGIES RESEARCH CENTRE IRELAND, LIMITED, Cork (IE)

(72) Inventors: Yonghua Zhu, Montluel (FR); Catherine Thibaud, South Windsor, CT (US)

(73) Assignee: UNITED TECHNOLOGIES RESEARCH CENTRE IRELAND, LIMITED, Cork City (IE)

( * ) Notice: Subject to any disclaimer, the term of this patent is extended or adjusted under 35 U.S.C. 154(b) by 267 days.

(21) Appl. No.: 17/116,264

(22) Filed: Dec. 9, 2020

(65) Prior Publication Data

US 2021/0179275 A1 Jun. 17, 2021

(30) Foreign Application Priority Data

Dec. 10, 2019 (EP) .................................... 19215042

(51) Int. Cl.
*B64D 13/00* (2006.01)
*B64D 13/08* (2006.01)
*B64D 13/06* (2006.01)

(52) U.S. Cl.
CPC ........ *B64D 13/08* (2013.01); *B64D 2013/003* (2013.01); *B64D 2013/0603* (2013.01);
(Continued)

(58) Field of Classification Search
CPC .. B64D 13/08; B64D 13/06; B64D 2013/003; B64D 2013/0603; B64D 2013/0618; B64D 2013/0688; B64D 2013/0648; Y02T 50/50
See application file for complete search history.

(56) References Cited

U.S. PATENT DOCUMENTS 3,367,256 A * 2/1968 Townsend .............. B64D 13/02
236/82
3,842,720 A * 10/1974 Herr ...................... B64D 13/02
454/71

(Continued)

FOREIGN PATENT DOCUMENTS

EP 1129941 A2 9/2001

OTHER PUBLICATIONS

European Search Report for Application No. 19215042.3, dated May 28, 2020, 7 pages.

*Primary Examiner* — Jacob M Amick
*Assistant Examiner* — Sherman D Manley
(74) *Attorney, Agent, or Firm* — Cantor Colburn LLP

(57) ABSTRACT

An aircraft environmental control system includes a bleed air input and a RAM air input, heat exchanger means for receiving bleed air from the bleed air input and RAM air from the RAM air input and using the RAM air to cool the bleed air, and ejector arranged to receive bleed air from the bleed air input at a nozzle shaped to reduce the pressure of the received bleed air such as to create a low pressure area in the ejector. The ejector has a port arranged such that ambient air is drawn into the ejector due to the low pressure area in the ejector. The ambient air is mixed with bleed air to provide mixed air that is further pressurised and conditioned and combined with the cooled bleed air provided to the aircraft.

8 Claims, 1 Drawing Sheet

(52) U.S. Cl.
CPC ............... *B64D 2013/0618* (2013.01); *B64D 2013/0688* (2013.01)

(56) References Cited

U.S. PATENT DOCUMENTS

| | | | | |
|---|---|---|---|---|
| 4,285,466 | A * | 8/1981 | Linscheid | B64D 13/04 236/13 |
| 5,114,103 | A * | 5/1992 | Coffinberry | B64C 21/06 244/209 |
| 5,287,694 | A * | 2/1994 | Davis | F04F 5/16 60/785 |
| 5,299,763 | A | 4/1994 | Bescoby et al. | |
| 9,205,925 | B2 * | 12/2015 | Bruno | B64D 13/02 |
| 9,372,014 | B2 * | 6/2016 | Nagano | F25B 41/00 |
| 10,358,221 | B2 | 7/2019 | Sautron | |
| 10,408,501 | B2 * | 9/2019 | Elsherbini | F25B 1/06 |
| 11,305,878 | B2 * | 4/2022 | Sautron | B64D 15/00 |
| 2001/0004837 | A1 | 6/2001 | Sauterleute | |
| 2013/0118191 | A1 * | 5/2013 | Zywiak | B64D 13/06 62/172 |
| 2016/0083100 | A1 | 3/2016 | Bammann et al. | |
| 2018/0057171 | A1 * | 3/2018 | Sautron | F02C 3/04 |
| 2018/0187929 | A1 * | 7/2018 | Liu | F25B 9/002 |
| 2018/0237143 | A1 * | 8/2018 | Bombled | B64D 13/02 |
| 2018/0312262 | A1 * | 11/2018 | Wiegers | F04F 5/16 |
| 2019/0285324 | A1 | 9/2019 | Valiquette et al. | |

* cited by examiner

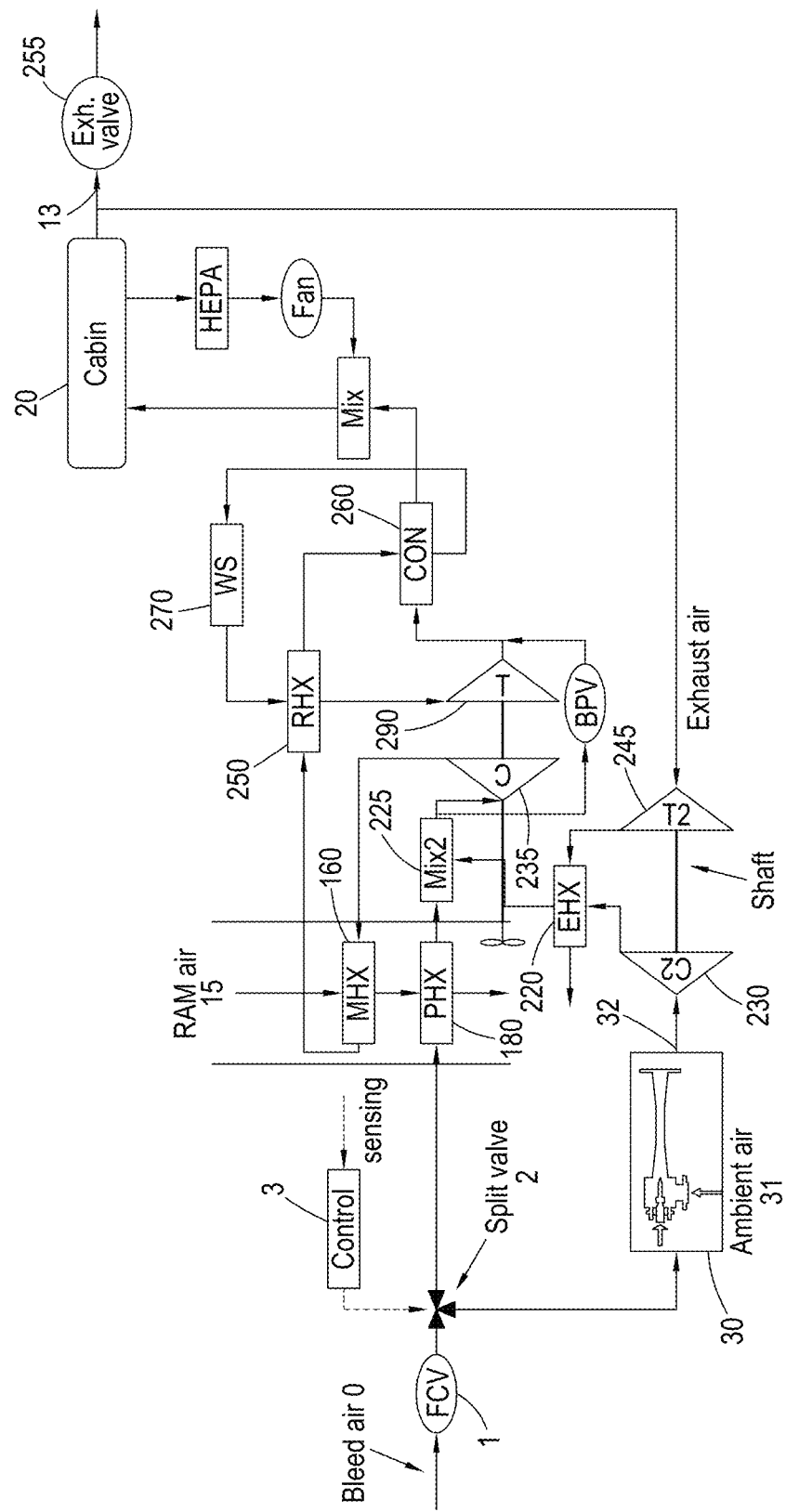

AIRCRAFT ENVIRONMENTAL CONTROL SYSTEM

FOREIGN PRIORITY

This application claims priority to European Patent Application No. 19215042.3 filed Dec. 10, 2019, the entire contents of which is incorporated herein by reference.

TECHNICAL FIELD

The present disclosure is concerned with environmental control systems for aircraft which provide pressurised and conditioned air to the aircraft cabin for the health and comfort of passengers and crew.

BACKGROUND

Environmental control systems (ECS) are provided in aircraft to provide pressurised and conditioned air to the aircraft cabin. Regulations provide for the minimum flow of conditioned air to be fed into the cabin per passenger. The Federal Aviation Authority (FAA) requires that fresh air flow rate to be at least 0.25 kg/min per passenger in order to dilute contaminants generated in the cabin, to provide thermal comfort and oxygen for occupants and to maintain cabin pressure. An ECS must be able to comply with such regulations while maximising efficiency in terms of power consumption but also minimizing overall size and weight of the ECS.

Generally, particularly in commercial aircraft, fresh air from the aircraft engine (bleed air) or compressed ambient air is used to provide the ECS air flow. The incoming air is, however, at a relatively high temperature and pressure and needs to be conditioned to the appropriate temperature and pressure before it is fed into the cabin. The way this is usually done is to use ambient air, brought into the system via an air intake device, such as a scoop. This air—so-called RAM air—is used in a system of heat exchangers to cool the bleed air or compressed ambient air. The RAM air is firstly used in a main heat exchanger (MHX) as a heat sink to cool the bleed air or compressed ambient air and then in a primary heat exchanger (PHX). By the time the RAM air has passed through the MHX, its temperature has already increased substantially. The ECS of an aircraft consumes the majority of the non-propulsive power. Much of this energy is consumed in extracting and conditioning the bleed air.

There is great pressure on the aircraft industry to improve energy efficiency and to reduce emissions and there is, therefore, a need for a more energy efficient ECS. It would be desirable to reduce the amount of bleed air required by the ECS.

SUMMARY

According to one aspect, there is provided an aircraft environmental control system, comprising a bleed air input and a RAM air input; heat exchanger means for receiving bleed air from the bleed air input and RAM air from the RAM air input and using the RAM air to cool the bleed air, and means for providing the cooled bleed air to the aircraft, the system further comprising an ejector arranged to receive bleed air from the bleed air input at a nozzle shaped to reduce the pressure of the received bleed air such as to create a low pressure area in the ejector, the ejector having a port arranged such that ambient air is drawn into the ejector due to the low pressure area in the ejector, and wherein the ambient air is mixed with bleed air to provide mixed air that is combined with the cooled bleed air which is recovered to an intermediate pressure and temperature when leaving ejector. This air stream leaving the ejector is conditioned, including compressed and cooled, before combining with another stream of bleed air that is pre-cooled by a primary heat exchanger (PHX). The combined air is then conditioned through the ECS before provided to the aircraft.

A corresponding method is also provided.

In a preferred embodiment, the mixed air leaving the ejector is compressed by a compressor and then cooled by a heat exchanger before being combined with the bleed air out from the primary heat exchanger, PHX.

The mixed air leaving the ejector is preferably compressed wherein the compressor is powered by a turbine extracting power from conditioned air exhausted from the aircraft cabin.

Preferably the mixed air is cooled by a cooling fluid in the heat exchanger and the cooling fluid comprises conditioned air exhausted from the aircraft cabin.

BRIEF DESCRIPTION OF THE DRAWINGS

FIG. 1 is a schematic view of an environmental control system according to a first embodiment in accordance with the disclosure.

DETAILED DESCRIPTION

FIG. 1 shows one embodiment of an ECS according to the disclosure. It is envisaged that other configurations could fall within the scope of the invention as described by the claims.

In order to reduce the amount of bleed air used by the ECS, the system of the present disclosure uses an ejector to suck ambient air into the system to compensate bleed air flow rate.

First, the parts of the ECS also known from conventional ECS systems will be described.

The ECS provides conditioned air to the aircraft cabin 20. The source air is bleed air 0 from the aircraft engine. This is provided to the ECS via a flow control valve 1 which changes position depending on flight conditions of the aircraft. As the bleed air temperature and pressure are too high for the conditioned air, cool RAM air 15 is provided into the ECS. The RAM air is used as the cooling or working fluid in a heat exchange system to which the bleed air is provided as the fluid to be cooled. The heat exchange system can be any available heat exchanger known in the art. In the examples shown, the heat exchange system comprises a main heat exchanger MHX 160 followed by a primary heat exchanger PHX 180. The RAM air acts as a heat sink, in the heat exchange system, thus cooling the bleed air.

A split valve 2 is controlled by a controller 3 to split the bleed air into two streams. One stream goes to the primary heat exchanger 180, and the other flows to a compressor 230, then, preferably, through a heat exchanger 220, and then the streams are mixed at a mixer 225. The mixed air is then compressed at 235.

After the compression phase, the main stream passes through the main heat exchanger 160 and then passes through the hot side of the reheater, RHX, 250 and condenser, CON, 260 where condensates form. After entering the water separator, WS, 270 the collected condensate is sprayed into the RAM channel to enhance heat transfer effect. The export dry air undergoes temperature and pressure reductions in the turbine, T, 290 after passing through the cold side of RHX. The conditioned bleed air is provided via the cold side of the condenser 260 to the cabin 20 to set the cabin air to the desired temperature and pressure. The cabin air needs to be maintained at the required temperature and pressure, and as the air becomes warm it is fed out of the cabin as exhaust air 13 and is replaced by new conditioned air. As mentioned above, this exhaust air is then usually just emitted to the outside environment as waste.

In order to reduce the amount of bleed air used by the ECS, the system of the present disclosure uses an ejector to suck in ambient air as will be described in more detail below, with reference to FIG. 1. The system uses an ejector 30 which consists of a converging/diverging nozzle, a mixing chamber and a diffuser, located in the stream of bleed air from the split valve 2 to the compressor 230. The ejector 30 uses the pressure energy in the bleed air moving through it to convert to velocity energy by means of an adiabatic expansion in the ejector. Due to the pressure drop in the fluid as its pressure energy is converted to velocity energy, a low pressure zone is created before the mixing chamber. This low pressure sucks in ambient air at a port 31 of the ejector 30 which mixes with the bleed air in the mixing chamber. The mixed fluid then enters the diverging portion (diffuser) of the ejector where its velocity energy is converted to pressure energy—i.e. the mixed air is slowed down and the pressure increases to an intermediate pressure. The expanded mixed air also has an intermediate temperature. This air is provided at outlet 32 of the ejector.

The air from outlet 32 is then compressed by compressor 230, after which it is mixed with the first stream of bleed air from the split valve 2 at the mixer 225.

Operation of the rest of the system is the same as for a conventional ECS. Thus, the present system uses the ejector to suck in ambient air to be mixed with bleed air to provide the conditioned air, thus reducing the amount of bleed air needed.

An embodiment of the ECS of this disclosure can also provide a further efficiency advantage, making use of exhaust air that would usually be wasted.

Usually, when an ECS operates, fresh and conditioned air is introduced into the cabin and an exhaust valve is used to exhaust the correct amount of air from the cabin and maintain the prescribed pressure. During flight, the exhaust air is usually at a higher temperature and pressure than ambient air but has already been cooled by the air conditioning system and is, therefore, cooler than, and at a lower pressure than incoming bleed air or compressed ambient air. The exhaust air is dumped overboard and, although, as described above, much energy has been involved in conditioning that air for use in the ECS, the air exhausted from the ECS is essentially wasted.

This exhaust air can be put to use in a system according to this disclosure, as described below.

Because the temperature of the air at the output of the compressor 230 may be too high, it can be cooled, before entering the mixer 225, by a heat exchanger 220. In a preferred embodiment, and to make efficient use of the exhaust air that is expelled from the cabin 20, Exhaust air 13 can be used in the ECS to drive a turbine 245 that drives the compressor 230. Further, the exhaust air 13, expanded by the turbine 245, can be used in the heat exchanger as cooling fluid. An exhaust air valve 255 that is usually already present to eject the exhaust air from the cabin 20 may be used to regulate the amount of exhaust air passing through the turbine 245, thus regulating the power for the compressor 230.

In some cases (such as in ground condition) there is very little difference between cabin pressure and ambient pressure and so the exhausted air could not be expanded enough by the turbine 245. In that case, the system of this disclosure would close off the stream flow to the ejector 30 and the system would operate as a conventional ECS.

As mentioned above, the controller 3 controls the split valve to control the amount of bleed air provided to the ECS via the conventional conditioning arrangement and the bleed air that is directed to the ejector to cause ambient air to be drawn into the system. There may be a default control depending on e.g. flight conditions, aircraft speed or the like. It is also envisaged that the control can be adjusted to obtain optimal efficiency.

The system of this disclosure provides several benefits, including a reduction in bleed air extraction due to compensation from ambient air; reduction in fuel burn of the ECS; recovery of exhaust air is possible meaning that no additional energy is required; and the ECS can be operated in a more energy efficient and environmentally friendly way, etc.

The invention claimed is:

1. An aircraft environmental control system, comprising:
a bleed air input and a RAM air input;
heat exchanger means for receiving bleed air from the bleed air input and RAM air from the RAM air input and using the RAM air to cool the bleed air;
means for providing the cooled bleed air to the aircraft;
an ejector arranged to receive bleed air from the bleed air input at a nozzle shaped to reduce the pressure of the received bleed air such as to create a low pressure area in the ejector, the ejector having a port arranged such that ambient air is drawn into the ejector due to the low pressure area in the ejector, and wherein the ambient air is mixed with bleed air to provide mixed air that is combined with the cooled bleed air provided to the aircraft; and
a compressor arranged to compress the mixed air before being combined with the bleed air.

2. The aircraft environmental control system of claim 1, wherein the compressor is powered by a turbine expanding conditioned air exhausted from a cabin of the aircraft.

3. The aircraft environmental control system of claim 1, further comprising a heat exchanger arranged to cool the mixed air before being combined with the cooled bleed air.

4. The aircraft environmental control system of claim 3, wherein the mixed air is cooled by a cooling fluid in the heat exchanger.

5. The aircraft environmental control system of claim 4, wherein the cooling fluid comprises expanded conditioned air exhausted from a cabin of the aircraft.

6. A method of providing conditioned air to an aircraft, the method comprising:
receiving bleed air from the aircraft;
cooling the bleed air using RAM air; and
providing the cooled bleed air to the aircraft;
wherein the pressure of the received bleed air is reduced in a nozzle of an ejector and ambient air is drawn into the ejector to mix with the bleed air to provide mixed air that is combined with cooled bleed air and provided to the aircraft; and
compressing the mixed air before it is combined with the cooled bleed air.

7. The method of claim 6, further comprising cooling the mixed air before it is combined with the cooled bleed air.

8. The method of claim 7, whereby the mixed air is cooled using conditioned air exhausted from the aircraft cabin.

\* \* \* \* \*